United States Patent [19]
Shadbourne et al.

[11] Patent Number: 6,098,702
[45] Date of Patent: Aug. 8, 2000

[54] VIBRATION DAMPER FOR ENGINE COOLING MODULE

[75] Inventors: Alan P. Shadbourne, Torrance; David G. Bridgnell, Palos Verdes, both of Calif.

[73] Assignee: AlliedSignal Inc., Morristown, N.J.

[21] Appl. No.: 09/211,838

[22] Filed: Dec. 15, 1998

Related U.S. Application Data

[60] Provisional application No. 60/068,162, Dec. 18, 1997.

[51] Int. Cl.$^7$ ........................................................ F28F 7/00
[52] U.S. Cl. ................................ 165/69; 165/67; 165/81; 180/68.4
[58] Field of Search ................................ 165/67, 69, 41, 165/42, 81; 180/68.4

[56] References Cited

U.S. PATENT DOCUMENTS

| | | | |
|---|---|---|---|
| 4,519,467 | 5/1985 | Saunders | 180/68.4 |
| 4,770,234 | 9/1988 | Hiraoka | 165/69 |
| 5,269,367 | 12/1993 | Susa et al. | 165/67 |
| 5,566,748 | 10/1996 | Christensen | 165/67 |
| 5,570,738 | 11/1996 | Christensen | 165/67 |
| 5,667,004 | 9/1997 | Kroetsch | 165/41 |
| 5,671,803 | 9/1997 | Tepas et al. | 165/41 |

*Primary Examiner*—Ira S. Lazarus
*Assistant Examiner*—Terrell McKinnon
*Attorney, Agent, or Firm*—Felix L. Fischer

[57] ABSTRACT

A vibration damper is provided on the cooling module of an internal combustion engine to attenuate the response of the module to low frequency road excited vibration.

9 Claims, 12 Drawing Sheets

VIBRATION DAMPER FOR ENGINE COOLING MODULE

CROSS REFERENCE TO RELATED APPLICATIONS

This application claims the priority of copending application Ser. No. 60/068,162 filed on Dec. 18, 1997 having the same title as the present application.

BACKGROUND OF THE INVENTION

1. Field of the Invention

The present invention relates generally to engine cooling modules for use in motor vehicle cooling systems and, more particularly, to an engine cooling module having a vibration damper designed to attenuate the cooling module response to low frequency road excited vibration.

2. Description of the Related Art

The internal combustion engines of motor vehicles generally include cooling modules, which may comprise a radiator assembly, a charge air cooler and a condenser.

Motor vehicles utilize a radiator assembly to eliminate waste heat from the internal combustion engine of the vehicle. The waste heat is a by-product of the internal combustion process and must be removed to allow steady state operation of the vehicle powertrain system. The radiator assembly generally includes a frame mounted to the chassis of the motor vehicle and a radiator mounted to the frame, the radiator comprising a core, or heat exchanger, and inlet and outlet manifolds or header tanks which communicate with the core. The radiator core comprises a plurality of tubes and fins, typically disposed in alternating laterally extending rows, with the tubes communicating with the inlet and outlet tanks so as to provide a flowpath for an engine coolant fluid, particularly water or glycol. Ambient cooling air is forced across the tubes and fins during operation of the vehicle, resulting in heat transfer from the heated engine coolant flowing inside the core tubes to the ambient air stream.

As the engines of heavy vehicles such as trucks may be turbocharged, such vehicles accordingly may include a charge air cooler (CAC) for the purposes of cooling the turbocharged engine intake air before the air enters the engine for the combustion process. The intake air is heated during the turbocharger compression assembly having a plurality of alternating tubes and fins, with ambient air forced process and must be cooled by the CAC to satisfy engine durability and performance requirements. The CAC typically includes inlet and outlet manifolds and a core across the tubes so as to cool the heated intake air flowing through the tubes during operation of the vehicle.

Heavy vehicles also typically include a refrigerant condenser assembly which receives high pressure, superheated refrigerant gas from the refrigerant compressor and condenses the gas into a high pressure liquid for expansion and cooling of the vehicle cab. The superheated vapor is first cooled to its saturation point at the existing operating pressure and is then condensed isothermally into the high pressure liquid. The high pressure liquid is then sub-cooled to a temperature below the condensing temperature.

U.S. Pat. No. 5,570,738 to Christensen discloses an exemplary cooling module for use in a motor vehicle, the disclosure of which is incorporated herein by this reference. The cooling module of Christensen comprises a condenser, a charge air cooler, and a radiator assembly which are disposed in series flow relationship with one another and are mounted forward of the engine fan.

Christensen discloses the use of elastomeric isolators on the radiator assembly to isolate the radiator assembly and cooling module from mechanical vibration loads during the operation of the motor vehicle. Generally, these elastomeric isolators are mounted on the radiator assembly to isolate the cooling module from damaging high frequency vibration input from the engine of the motor vehicle. However, the cooling module is still susceptible to relatively low frequency road excited vibration. This low frequency vibration can be very damaging to the cooling module if left unattenuated.

Consequently, there is a need for an improved mounting system for cooling modules that attenuates the response of the module to low frequency road excited vibration.

SUMMARY OF THE INVENTION

The present invention, therefore, provides an improved mounting system for cooling modules designed to attenuate the response of the module to low frequency road excited vibration. A vibration damper is provided on one side of the cooling module for attachment to the frame of the motor vehicle. The vibration damper is preferably a low frequency shock absorbing member.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 1:
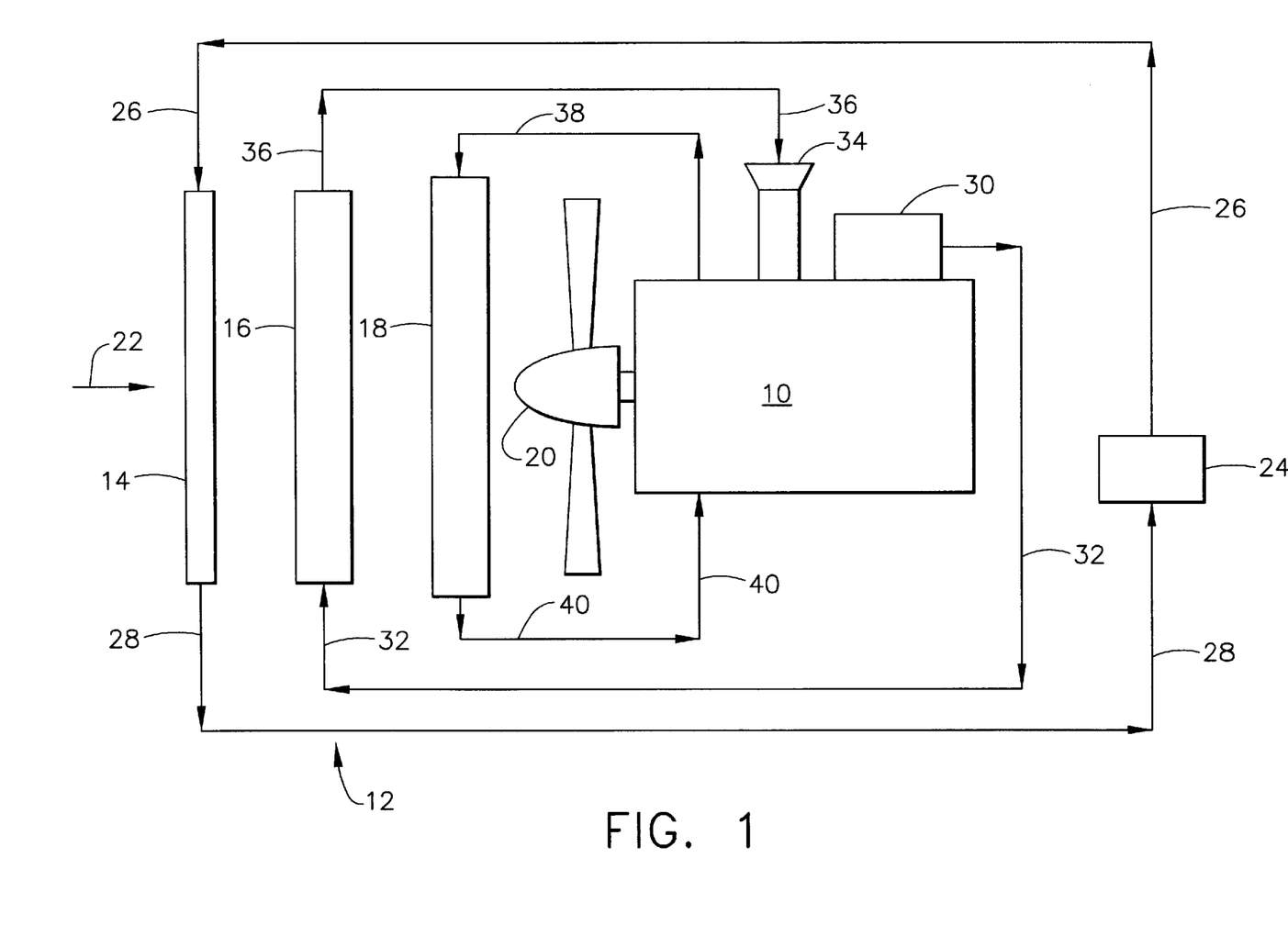
FIG. 1 is a schematic flow diagram of an exemplary cooling module of an internal combustion engine of a motor vehicle, including a radiator assembly.
Figure 2A:
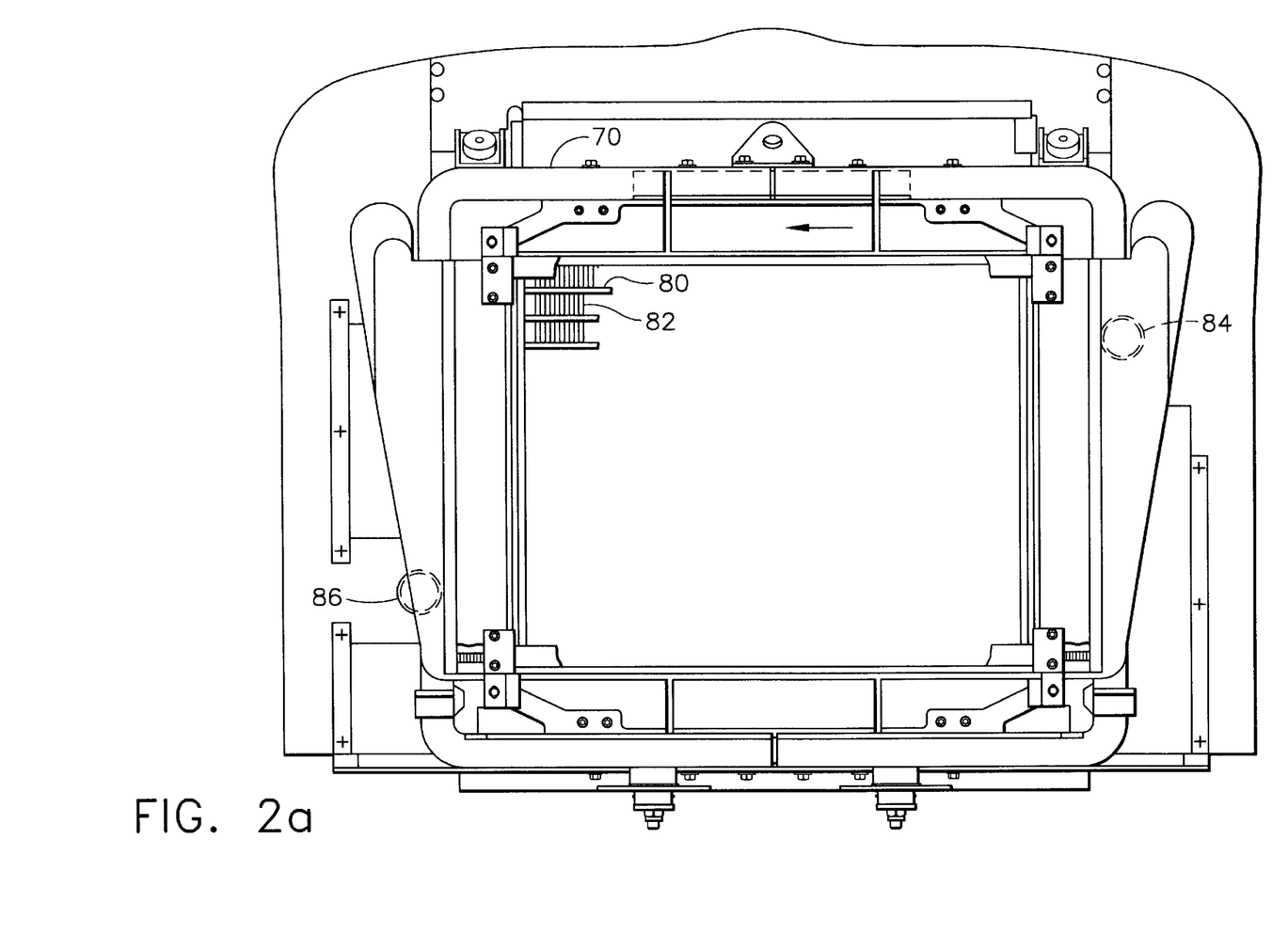
FIGS. 2a, 2b and 2c are multiple (front, top and side) elevational views of the cooling module of FIG. 1.
Figures 2B, 2C:
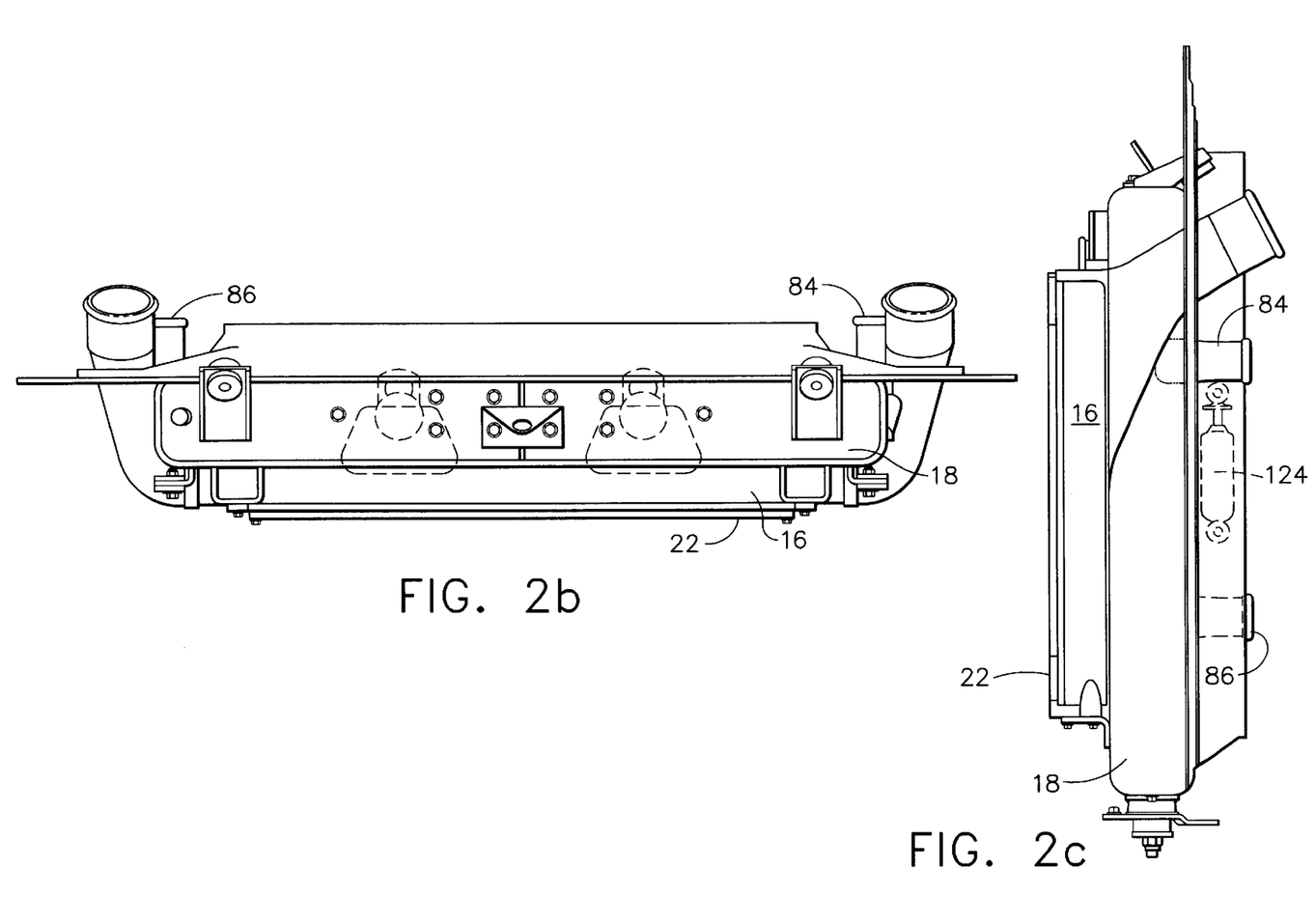
Figure 3A:
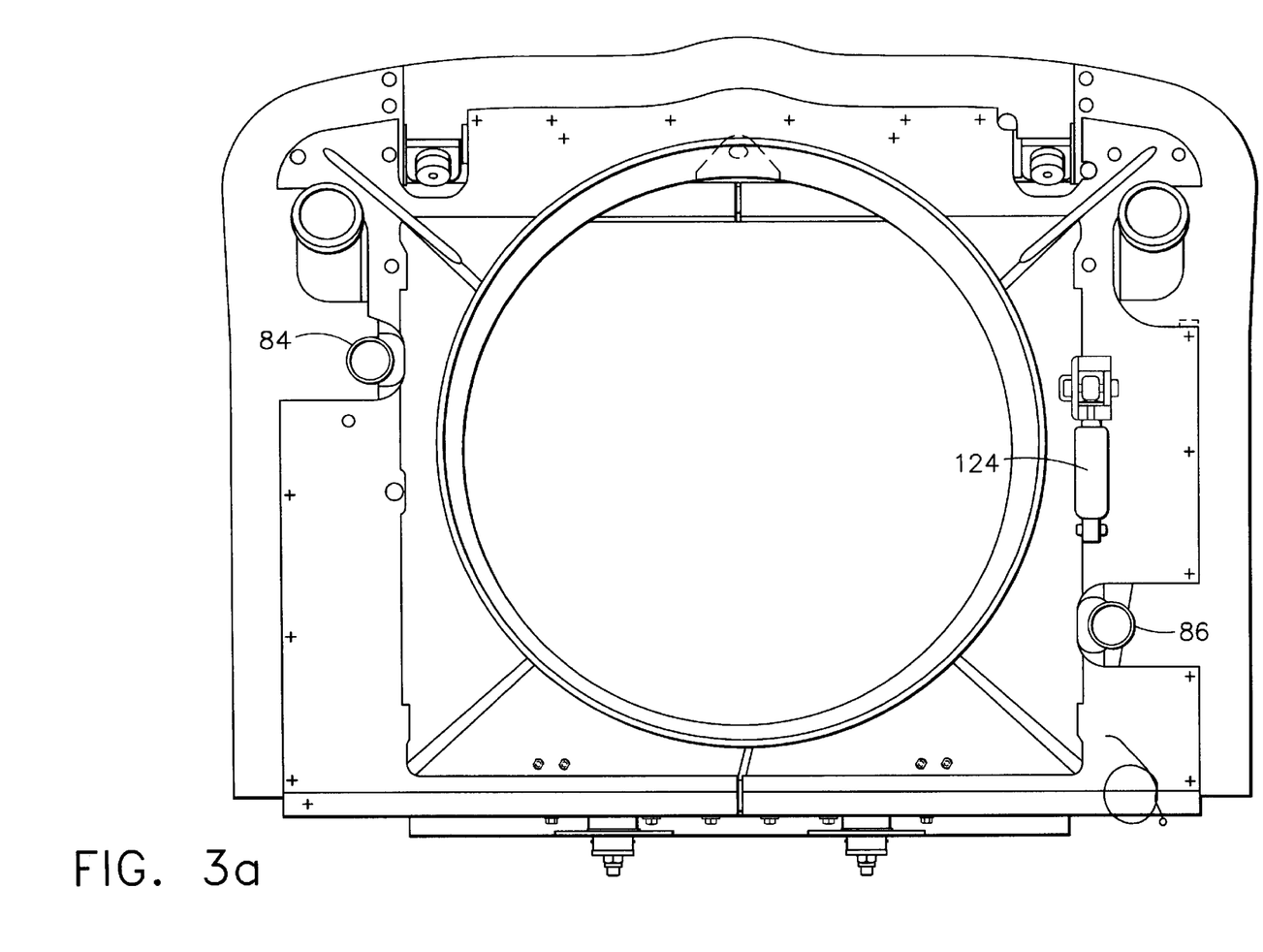
FIGS. 3a and 3b are multiple (back, and bottom) elevational views of the cooling module of FIG. 1.
Figure 3B:
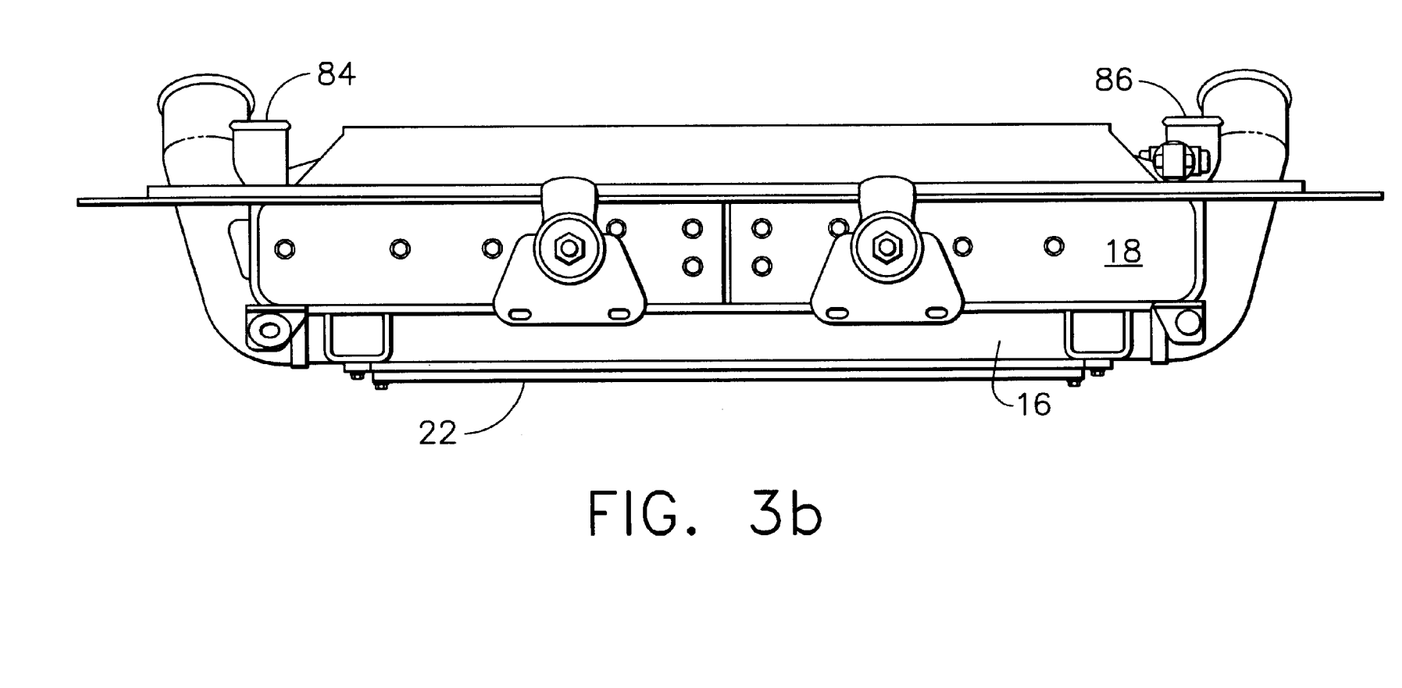
Figure 4:
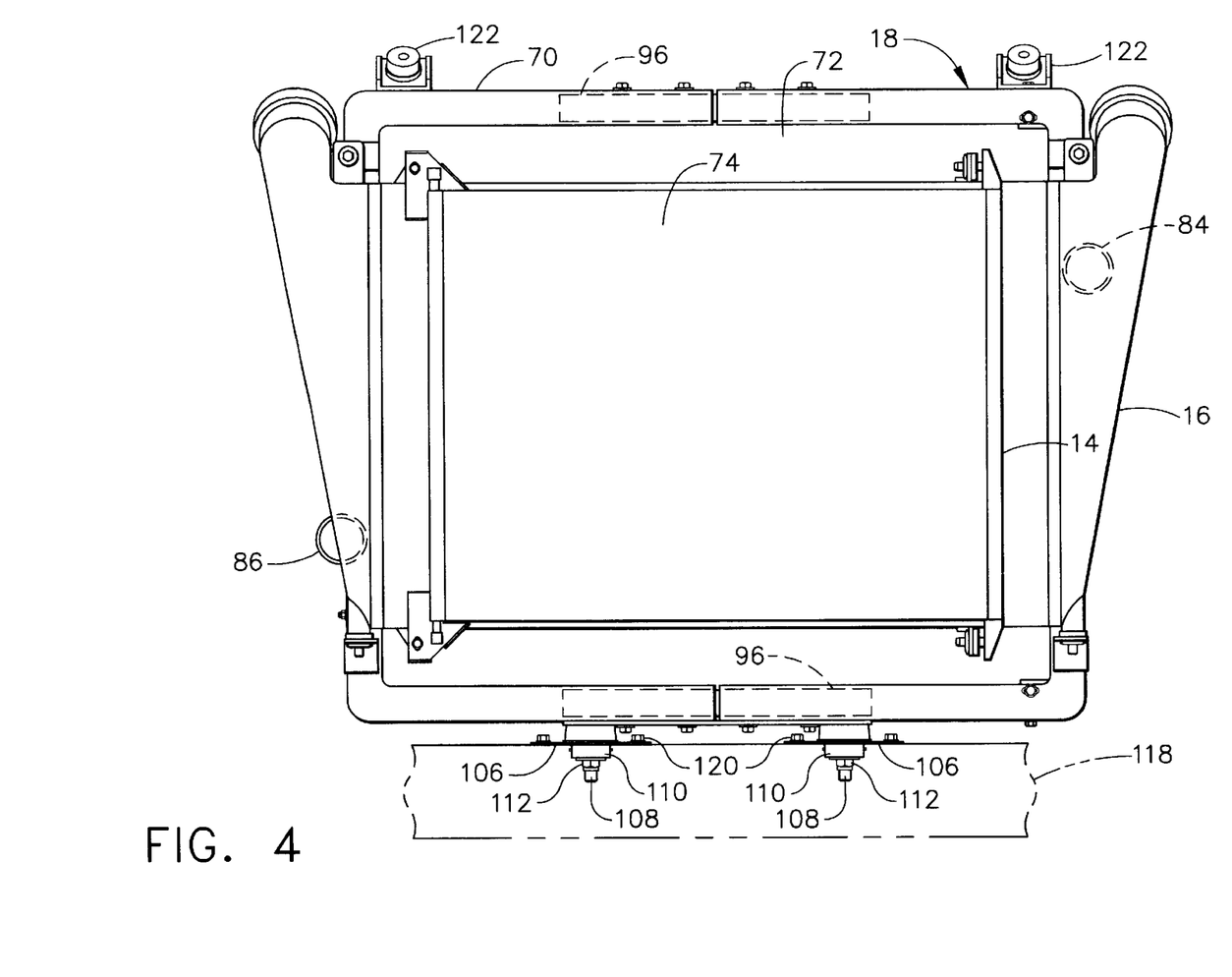
FIG. 4 is another front elevation view of the cooling module of FIG. 1, illustrating in more detail the components of the radiator assembly.

Referring now to the drawings, FIG. 1 schematically illustrates an internal combustion engine 10 of a motor vehicle incorporating a cooling module, indicated generally at 12. Cooling module 12 includes a condenser 14, a charge air cooler 16 and a radiator assembly 18 which are disposed in series flow relationship with one another and are mounted forward of a fan 20 of engine 10. During operation of engine 10, the suction action of fan 20 forces ambient air 22 to be drawn through, in succession, condenser 14, charge air cooler 16, and radiator assembly 18. Additionally, the flow of ambient air 22 is assisted by the forward motion of the associated motor vehicle.

During operation of engine 10, condenser 14 receives a high pressure, superheated refrigerant gas from a refrigerant compressor 24 of an air conditioning system used to cool the passenger compartment of the associated motor vehicle, via conventional conduits as indicated by flow arrows 26. The superheated vapor flowing through condenser 14 is first cooled to its saturation point by ambient air at the existing operating pressure of the vapor, and is then condensed isothermally by the ambient air into a high pressure liquid which returns to compressor 24 via conventional conduits as indicated by flow arrows 28.

In the exemplary embodiment illustrated in FIG. 1, engine 10 is used with a heavy vehicle such as a truck and includes a turbocharger, indicated generally at 30, for purposes of turbocharging the intake air of engine 10. The intake air is heated during the turbocharger compression process and must be cooled to satisfy engine durability and performance requirements. That is accomplished by routing the air discharged from the turbocharger 30 to the charge air cooler 16 via conventional conduits as indicated by flow arrows 32, where the heated intake air is cooled by ambient air 22 flowing through the charge air cooler 16. The intake air is then routed from the charge air cooler 16 to an intake manifold 34 of the engine via conventional conduits as indicated by flow arrows 36.

Engine 10 produces waste heat as a byproduct of the internal combustion process, which must be removed to allow steady state operation of the engine. The elimination of this waste heat is accomplished by the radiator assembly 18, with coolant fluid, typically water or glycol, routed from engine 10 to radiator assembly 18 via conventional conduits as indicated by flow arrow 38, where the coolant fluid is cooled by ambient air 22 as it flows over the radiator assembly. The coolant fluid then discharges from radiator assembly and is returned, via conventional conduits to engine 10 as depicted by flow arrows 40.

Referring now to FIGS. 2a–8, radiator assembly 18 is illustrated and described in detail. The radiator assembly 18 includes a frame 70, mounted to a chassis of the motor vehicle, and a radiator 72 disposed within and mounted to the frame. The radiator includes a central core 74 or heat exchanger, and a first and second end manifolds or inlet and outlet header tanks, which are attached to the radiator core. The core includes a plurality of laterally extending tubes 80, which are substantially parallel to one another, and which are in fluid flow communication with the header tanks of the radiator. The core includes a plurality of laterally extending fins 82 having a serpentine, or corrugated shape (not shown throughout for ease of illustration) which are interdigitated with the tubes.

The radiator 72 further includes an inlet tube 84 which communicates with the inlet header tank of radiator and is effective for receiving coolant fluid from the engine. Radiator 72 also includes an outlet tube 86 which communicates with the outlet header tank. The engine coolant fluid flows through the inlet tube 84 into the inlet header tank, through the tubes 80 where it is cooled by ambient air, and then to outlet header tank. The engine coolant fluid then discharges through the outlet tube 86 and is returned to engine 10.

Figure 5:
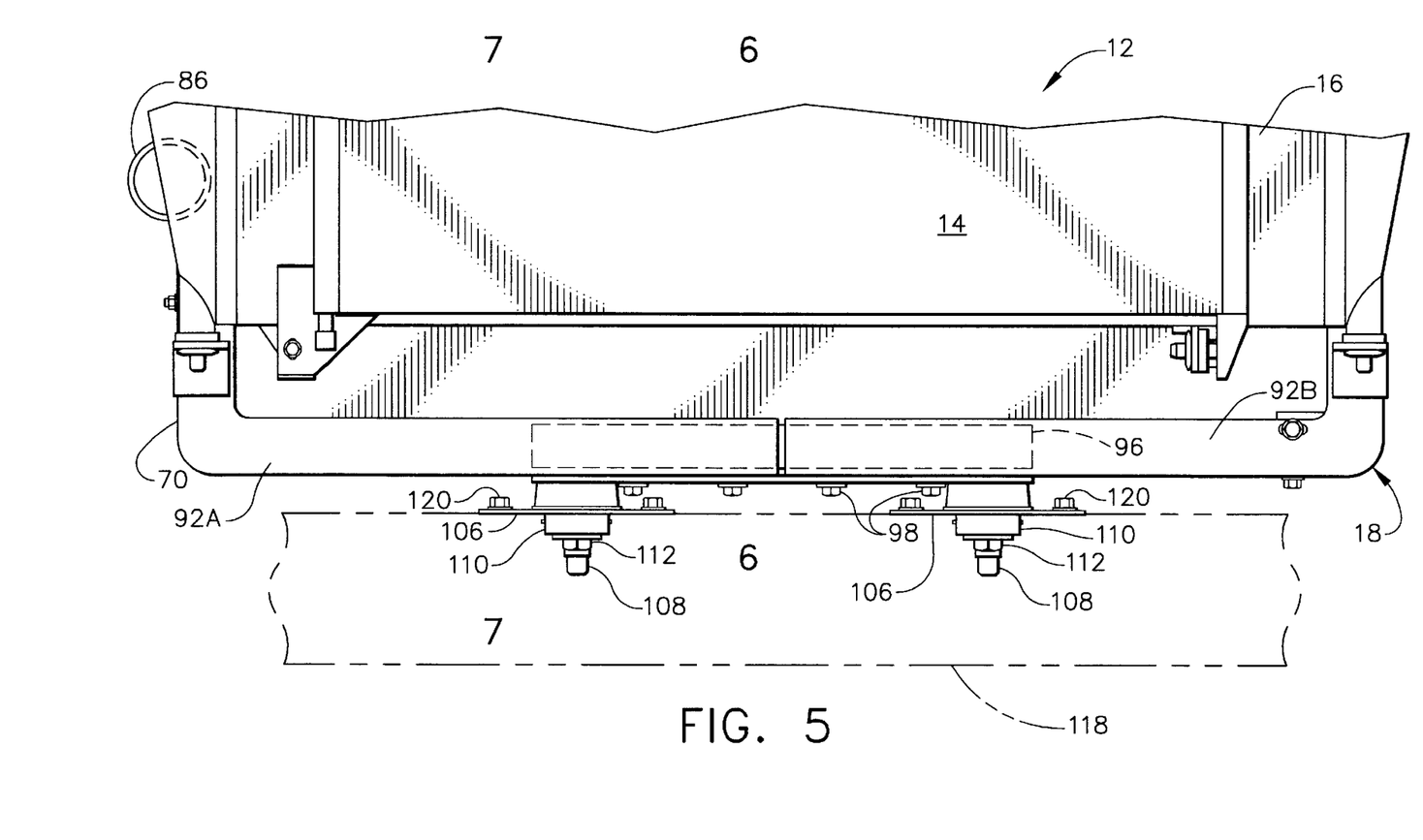
FIG. 5 is a fragmentary front elevational view illustrating the mounting of the radiator assembly to the chassis of the motor vehicle.
Figure 6:
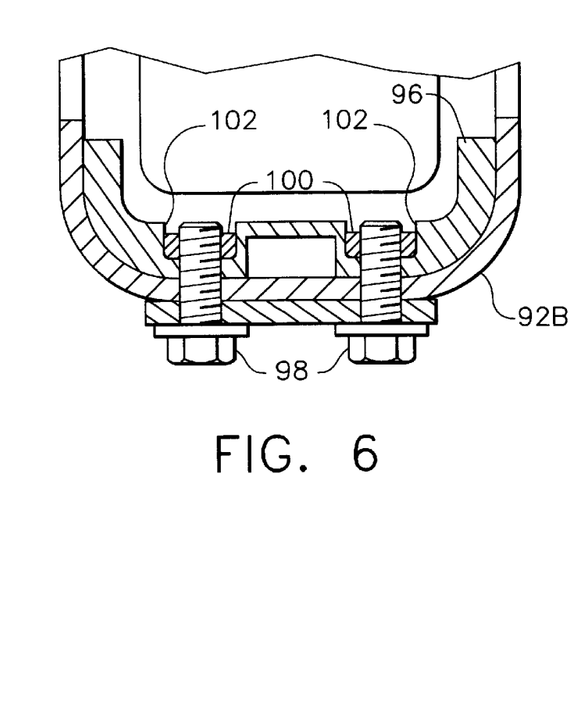
FIG. 6 is a view taken along line 6—6 in FIG. 5.
Figure 7:
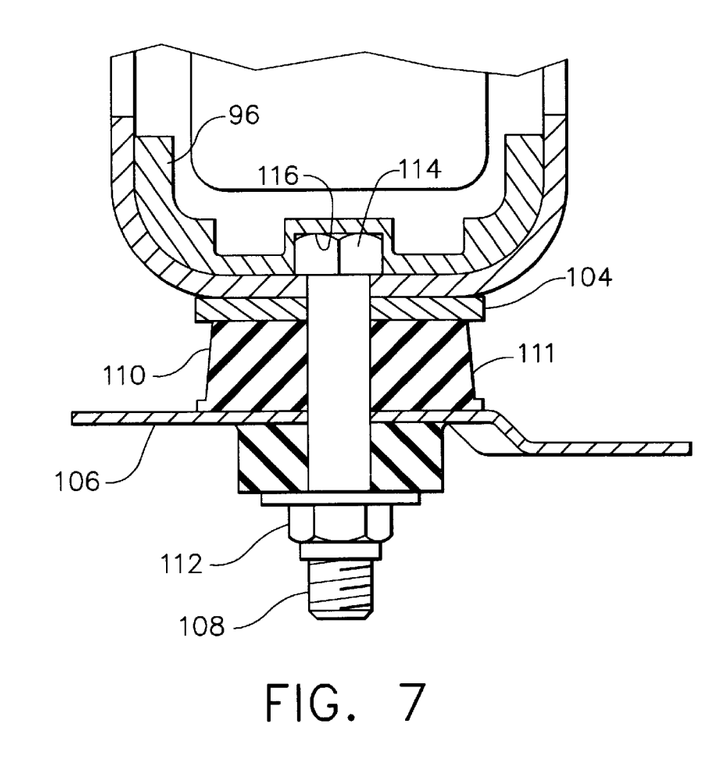
FIG. 7 is a view taken along line 7—7 in FIG. 4.

Turning now to FIGS. 5–8, the frame 70 of radiator assembly 18 includes a first and second generally U-shaped portions 88A and 88B respectively, which are substantially mirror images of one another. Portions 88A and 88B have a generally U-shaped cross section as shown in FIGS. 5 and 6. Portion 88A includes an upper, generally horizontally extending member 90A, a lower, generally horizontally extending member 92A, and a generally vertically extending member 94A interconnecting and attached to members 90A and 92A. Similarly, U-shaped portion 88B includes upper and lower generally horizontally extending members 90B and 92B respectively, and a generally vertically extending member 94B interconnecting and attached to members 90B and 92B. Portions 88A and 88B are connected to one another by a pair of generally U-shaped cross-section connecting members 96 of frame 70. An upper one of the connecting members 96 is attached to members 90A and 90B of portions 88A and 88B, by conventional fasteners such as bolts. Similarly, a lower one of the connecting members 96 is attached to members 92A and 92B of portions 88A and 88B, by similar means.

The frame further includes a doubler plate 104 (FIG. 8) which is fastened to members 92A and 92B and the lower one of connecting member 96 by bolts 98. Radiator assembly 18 further includes a pair of chassis mount plates 106, with each of the plates 106 being secured to frame 70 by a mount bolt 108, an elastomeric isolator 110 and a nut 112. Each isolator 110 has a first portion 111 disposed between frame 70 and one of the plates 106. Each of the bolts passes through a hole formed in the corresponding one of isolators 110, extends below plate 106 and is secured with one of the nuts 112. Each of the mount plates is fastened to a crossmember 118 of the motor vehicle chassis by conventional fasteners such as bolts 120, so as to mount frame 70 to chassis cross-member 118.

Figure 8:
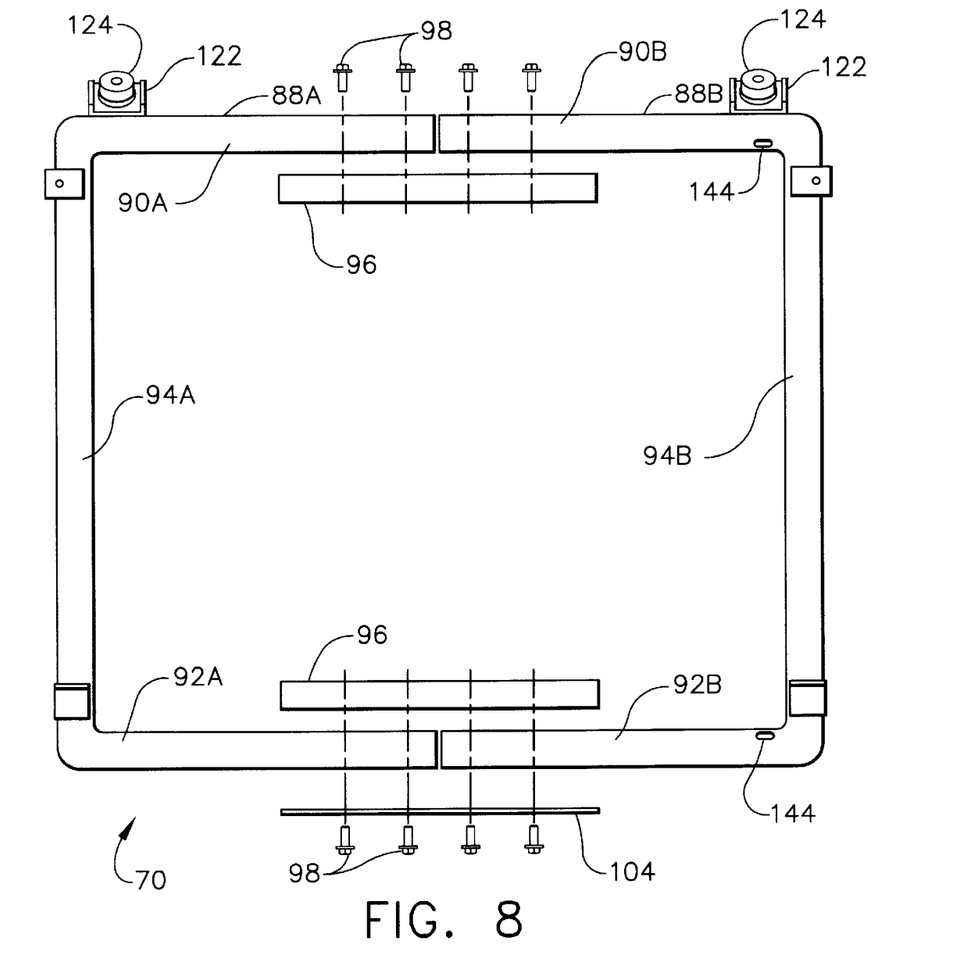
FIG. 8 is a front elevational view illustrating the frame of the radiator assembly.

Radiator assembly 18 further includes a pair of laterally spaced tie-rod brackets 122 which are attached by conventional means, such as welding, to frame 70. A first one of the brackets 122 is welded to member 90A of the U-shaped portion 88A of the frame, and the second mount bracket 122 is welded to the member 90B of the U-shaped portion 88B of the frame. An elastomeric isolator is disposed within a hole formed in each of the brackets 122. A pair of tie rods 121 are secured at an upper end thereof to the brackets 122 and at a lower end thereof to the motor vehicle chassis, for purposes of mounting frame 70 to the motor vehicle. The use of the lower elastomeric isolators 110 and the upper elastomeric isolators 124, isolates frame 70 from mechanical vibration loads during the operation of the motor vehicle. More particularly, the elastomeric isolators are designed to isolate the radiator assembly and the cooling module from damaging high frequency (approximately 54 Hz) vibration input from the engine.

Figure 9:
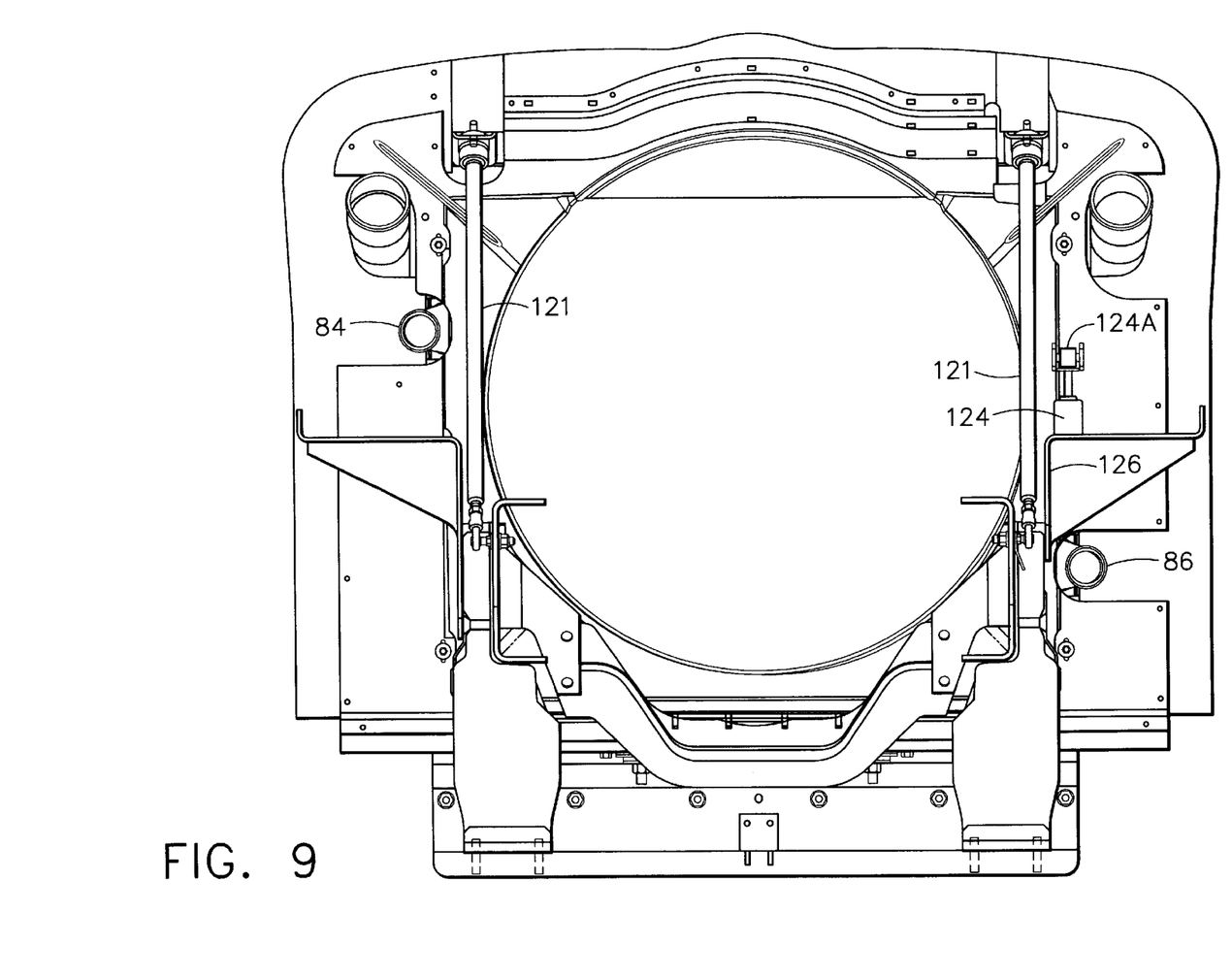
FIG. 9 is a back elevational view of the cooling module of FIG. 1 attached to the frame of a motor vehicle.
Figure 10:
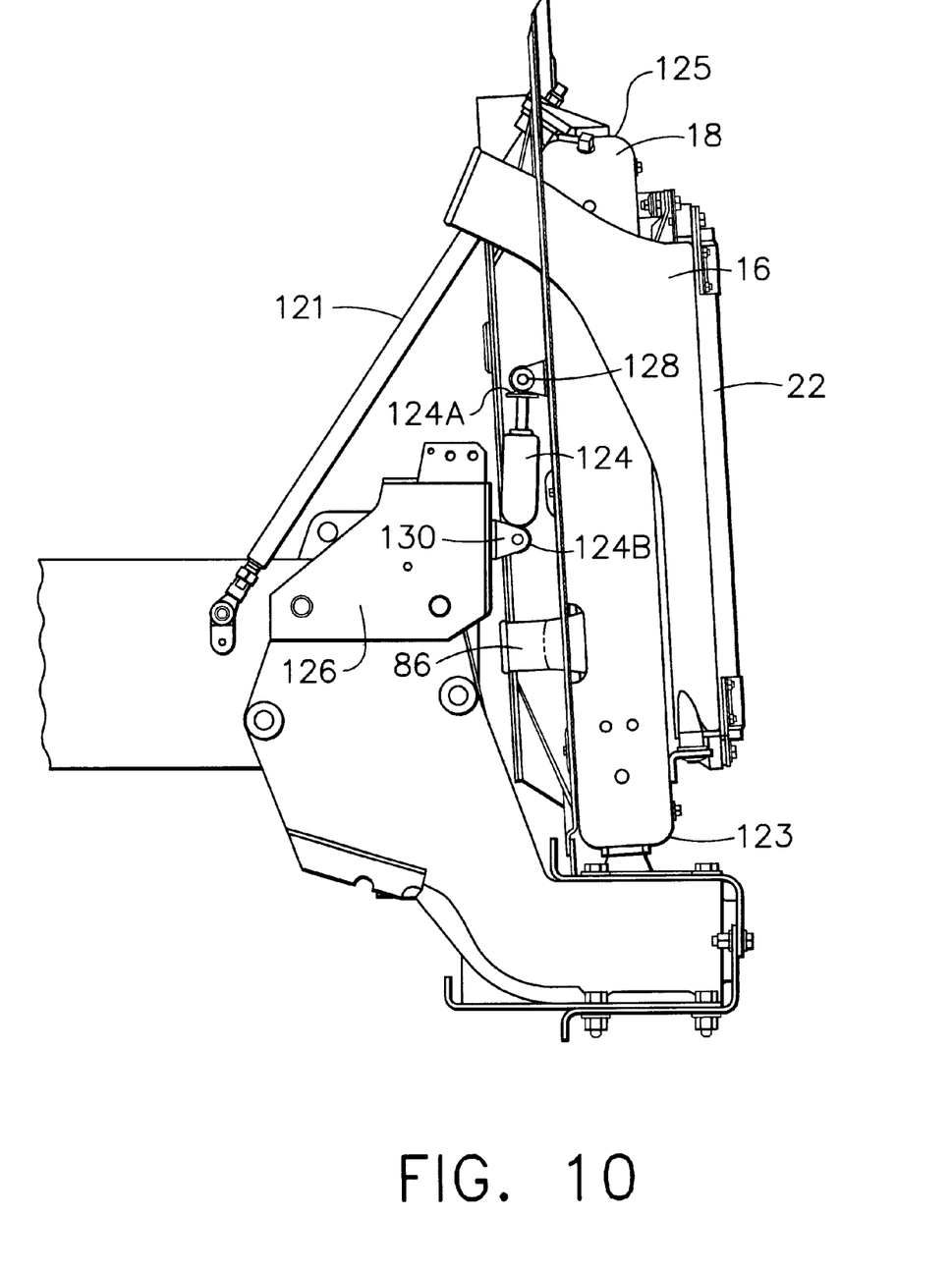
FIG. 10 is a side elevational view of the cooling module of FIG. 9.
Figure 11:
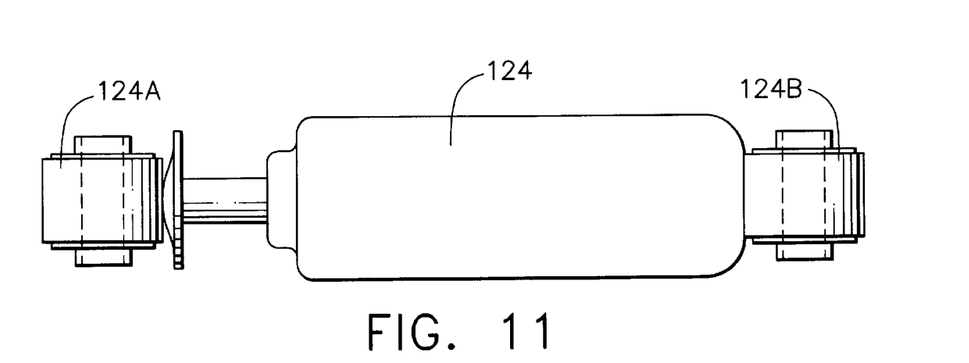
FIG. 11 is a side elevational view of a vibration damper according to the present invention.

To attenuate the response to low frequency (approximately 6 to 8 Hz) road excited vibration, the cooling module includes a vibration damper 124 positioned on one side of the cooling module, as can be best seen in FIGS. 9 and 10. For the embodiment shown in the drawings, the vibration damper is only mounted to one side of the cooling module. The vibration damper 124 is attached to the rear of the radiator assembly 18, on the outlet side of the radiator assembly. One end 124A of the vibration damper 124 is attached to the frame 70 of the radiator assembly, and the other end 124B of the vibration damper is attached to a rail 126 of the frame of the motor vehicle that supports the engine 10. Preferably, the radiator frame 70 includes a welded tab or attachment point 128 for the end 124A of the vibration damper 124. Similarly, the rail 126 preferably includes a welded tab or other attachment point 130 for the other end 124B of the vibration damper 124. It should be noted that the availability of space on the frame of the motor vehicle may determine the precise location of the attachment point 130.

The attachment and location of the vibration damper 124 relative to the cooling module 10 affects the resulting attenuation of the response of the cooling module to the low frequency vibration. A presently preferred location of the vibration damper is illustrated in FIGS. 9 and 10. As illustrated therein, the vibration damper 124 is preferably positioned relative to the cooling module such that one end of the vibration damper 124A is about two-thirds up the side of the cooling module. In other words, the ratio of the distance between a bottom portion 123 of the radiator frame 70 and end 124A of the vibration damper and the distance between the bottom portion 123 of the radiator frame and a top portion 125 of the radiator frame is about 2:3. In the exemplary embodiment of the present invention seen in FIG. 10, the first end of the vibration damper is attached about 24 inches from the bottom portion 123 of the radiator frame. Additionally, the vibration damper 124 is preferably angled about 5 degrees clockwise from the frame 70 of the radiator assembly of the cooling module when end 124B is attached to rails 126, as seen in FIG. 10.

In a presently preferred embodiment, the vibration damper is a viscous damper. More particularly, the vibration damper is preferably a low frequency shock absorbing member. In an exemplary embodiment of the present invention, the low frequency shock absorbing member is a MONROE shock absorber reference part number 47589, available from Monroe Automotive Equipment in Monroe, Mich. Other shock absorbing members having similar characteristics to the MONROE shock absorber are alternatively used with the present invention.

Figure 12:
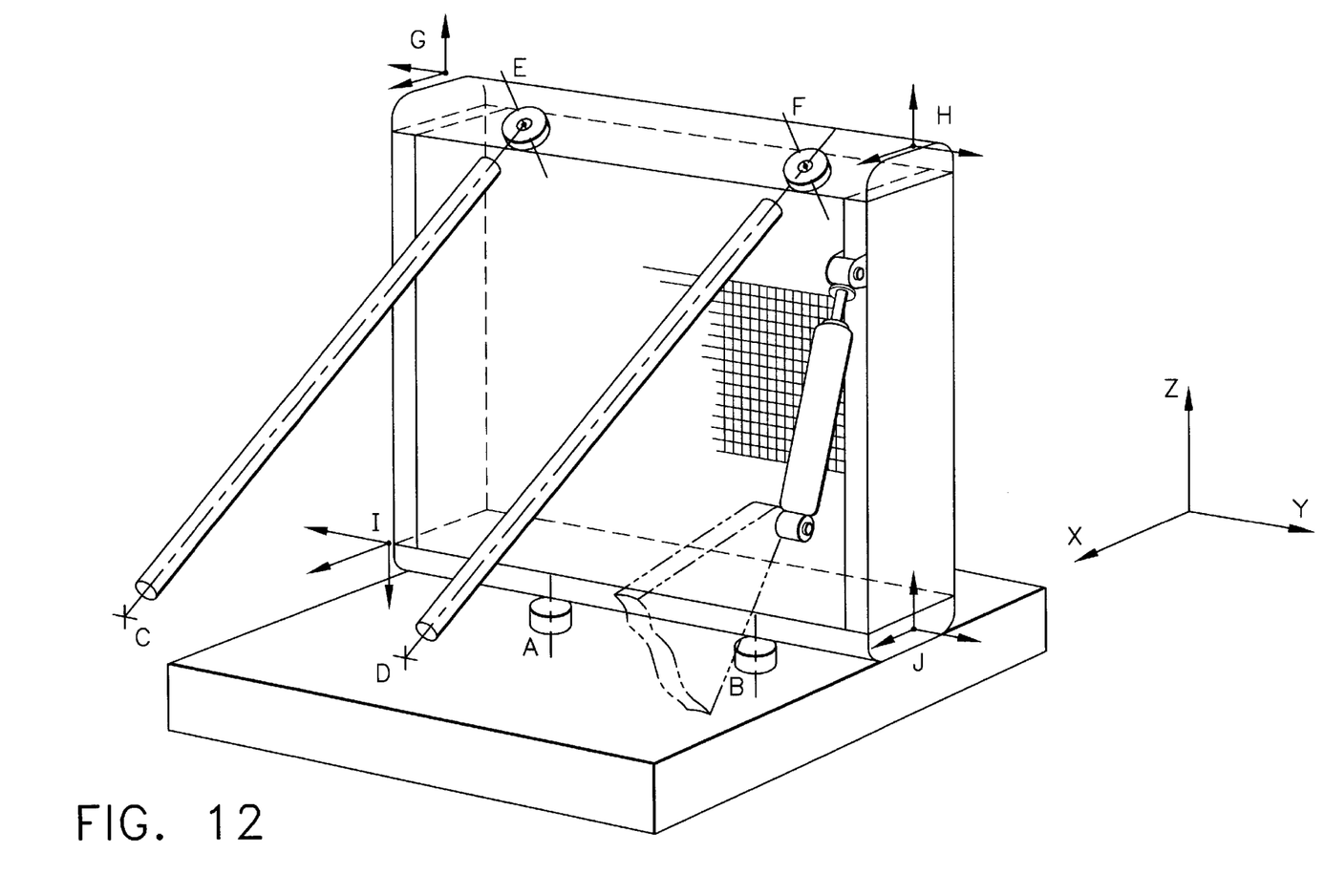
FIG. 12 is a schematic view of a prototype of the cooling module according to the present invention used during developmental vibration testing.

During the development of the present invention, vibration testing was done on the cooling module. FIG. 12 schematically illustrates a radiator assembly used as a testing unit during the vibration testing. An aluminum radiator filled with water was assembled on elastomeric vibration isolators (approximately 5000 lb/in stiffness each) at points A, B, E and F and attached to a rigid fixture plate at points A, B, C, and D. Additionally, 3-axis response accelerometers were located at points G, H, I and J. The unit was excited with a 0.5 g sinusoidal input from 5 to 50 Hz. The most predominant response mode by far was the fundamental rocking mode of the unit as a rigid body on the vibration isolators at 6.6 Hz in the "Y" or lateral axis. Without a vibration damper, the lateral response was as high as 3.99 g, which represented an amplification of about 8:1 above the input level. By way of contrast, adding a vibration damper according to the present invention (using a MONROE steering stabilizer part number SC2955) reduced the maximum response to 1.49 g, or an amplification of less than 3:1.

While a presently preferred embodiment of this invention has been shown and described, it would be apparent to those skilled in the art that many modifications are possible without departing from the inventive concept herein. Such modifications are within the scope and intent of the present invention as defined in the following claims.

What is claimed is:

1. A cooling module for use in a motor vehicle engine cooling system, the cooling module comprising:
    a radiator assembly; and
    a vibration damper having a first end of the damper coupled to one side of the
    radiator assembly and a second end of the damper adapted to be coupled to a frame of the motor vehicle, wherein the ratio of a first distance between a bottom portion of the radiator assembly and the first end of the vibration damper to a second distance between the bottom portion of the radiator assembly and a top portion of the radiator assembly is about 2:3.

2. The cooling module as defined in claim 1 wherein the first end of the vibration damper is attached about 24 inches from the bottom portion of the radiator assembly.

3. The cooling module as defined 1 wherein the vibration damper has an angular orientation of about 5 degrees from the radiator assembly when the second end of the vibration damper is coupled to the frame of the motor vehicle.

4. The cooling module as defined in claim 1 wherein the vibration damper is located on an outlet side of the radiator assembly.

5. The cooling module as defined in claim 1 wherein the vibration damper is a viscous damper.

6. The cooling module as defined in claim 5 wherein the viscous damper is a low frequency shock absorbing member.

7. The cooling module as defined in claim 6 wherein the low frequency shock absorbing member is designed to attenuate the response of the cooling module to low level frequency of about 6 Hz to about 8 Hz.

8. The cooling module as defined in claim 1 further comprising a charge air cooler attached adjacent the radiator assembly.

9. The cooling module as defined in claim 1 further comprising a condenser attached adjacent the charge air cooler.

* * * * *